MODULATING CIRCUIT ARRANGEMENTS

Filed Dec. 17, 1956 2 Sheets-Sheet 1

INVENTORS:
Alfred Benjamin Starks-Field
and
Thomas George Patterson
By: Baldwin & Wight, ATTORNEYS

MODULATING CIRCUIT ARRANGEMENTS

Filed Dec. 17, 1956

INVENTORS:
Alfred Benjamin Starks-Field
and
Thomas George Patterson
By: Baldwin & Wight, ATTORNEYS United States Patent Office 2,944,227

Patented July 5, 1960

2,944,227

MODULATING CIRCUIT ARRANGEMENTS

Alfred Benjamin Starks-Field, Chelmsford, and Thomas George Patterson, Shenfield, England, assignors to Marconi's Wireless Telegraph Company Limited, London, England, a British company Filed Dec. 17, 1956, Ser. No. 628,758

Claims priority, application Great Britain Jan. 19, 1956

7 Claims. (Cl. 332—37)

This invention relates to modulating circuit arrangements and more specifically to such arrangements of the kind in which modulation is effected by modulating the anode of a modulator valve having a grid which is driven by the carrier frequency to be modulated.

Consider the case of a modulator valve having a tuned anode load circuit and a large amplitude carrier input applied to its grid. If a modulating signal is applied to the anode the relationship between the radio frequency ouput from the tuned anode load and the mean current through the valve will be linear to a high degree and this linearity will remain even if the valve is changed for another one of slightly different characteristics. Thus the requirement for linear modulation is that the modulator valve shall be operated in such manner that the current through it for a given modulation input shall be substantially constant. A close approximation to this operating condition is obtained in those known modulating circuit arrangements of the kind referred to wherein the modulating signal is injected into the modulator valve anode circuit by means of a transformer, and the whole arrangement is made such as to ensure that a high impedance is reflected into the said anode circuit. A close approximation to the required operating condition is also obtained in those known modulating circuit arrangements of the kind referred to wherein a modulator valve and a modulating (i.e. controlling) valve are supplied in parallel with high tension potential from a potential source of high resistance. However, both these known circuit arrangements have serious practical defects. The type of arrangement in which the modulating potential is injected into the anode circuit by means of a transformer obviously cannot be used in those numerous cases in which the modulating potential contains a D.C. component which must not be lost. Furthermore, if the modulating signals include relatively high frequency components (as is the case, for example, with a video signal) stray capacity effects at the anode of the modulator valve tend to prevent the required operating condition being obtained. Although it is possible to compensate for such stray capacity effects, the necessary compensating circuits are troublesome and usually require re-adjustment and sometimes even modification if one modulator valve is replaced by another. The main objection to the known type of circuit arrangement in which modulator and modulating (controlling) valves are supplied in parallel from a high resistance source is, of course, that a high tension source of high potential and stability has to be provided.

The present invention seeks to provide improved modulating circuit arrangements of simple and reliable construction which will achieve a close approximation to the required operating condition hereinbefore set forth without the defects and limitations of the known circuit arrangements hereinbefore mentioned.

According to this invention a modulating circuit arrangement of the kind in which carrier input to be modulated is applied to a grid of a modulator valve the anode potential of which is controlled in accordance with modulating potentials, comprises a modulating valve with its anode connected to receive high tension from a source which also supplies high tension potential to said modulator valve, an amplifier fed with modulating potentials and connected to apply amplified modulating potentials to a grid of said modulating valve, and means for applying to said amplifier feed-back voltage substantially proportional to the current which flows through said modulator valve for a given applied modulating voltage.

In a preferred construction the anode-cathode space of the modulating valve is in series between the anode of the modulator valve and the high tension source, a direct current permeable impedance is connected in a shunt path extending from the cathode of the modulating valve across the circuit including the anode-cathode space of the modulator valve, and feed-back voltages in phase opposition are taken from the anode and cathode of the modulating valve to the amplifier.

In another embodiment the anode-cathode space of the modulating valve is connected in a shunt path across the circuit including the anode-cathode space of the modulator valve, and again feed-back voltages in phase opposition are taken from the anode and cathode of the modulating valve to the amplifier.

In a further, but not preferred, embodiment, the modulating and modulator valves are included in series with a direct current permeable impedance and the high tension source, and feed-back voltages are taken from across said impedance to the amplifier.

The invention is illustrated in the accompanying drawings which show diagrammatically three embodiments thereof, in which.

Figure 1:
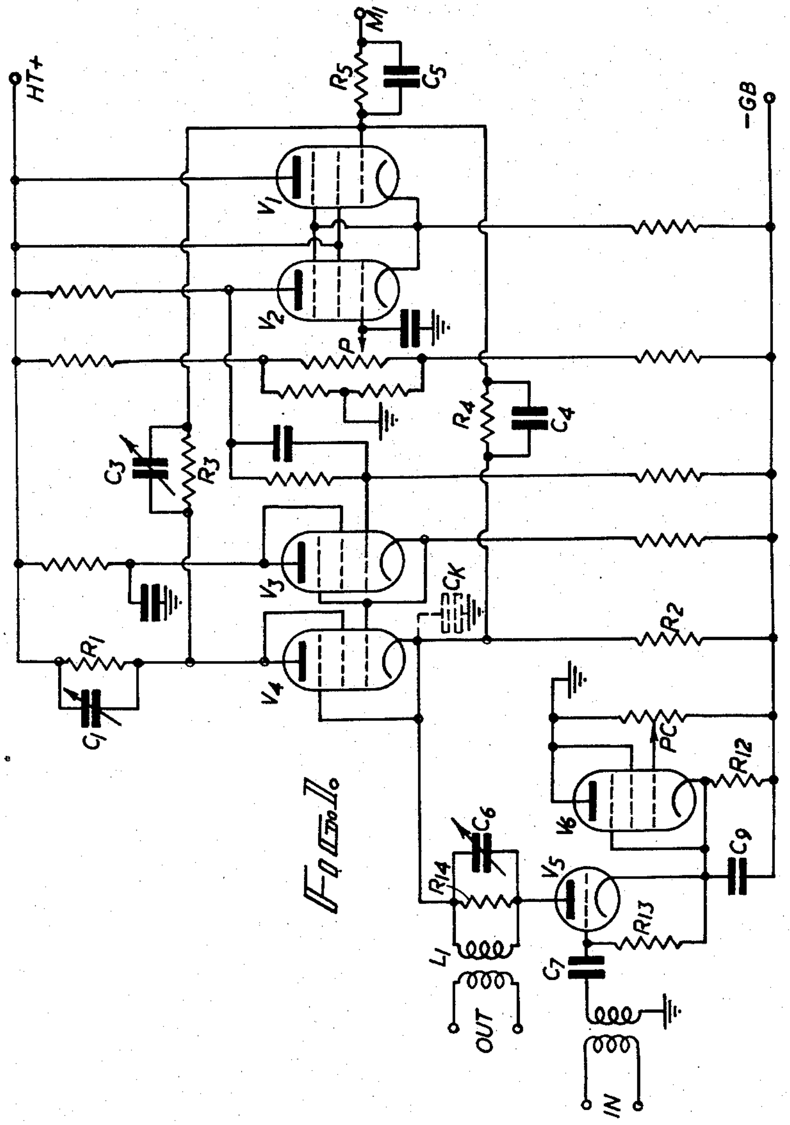
Fig. 1 shows a circuit arrangement of one form of modulation system embodying the invention.
Figures 2, 3:
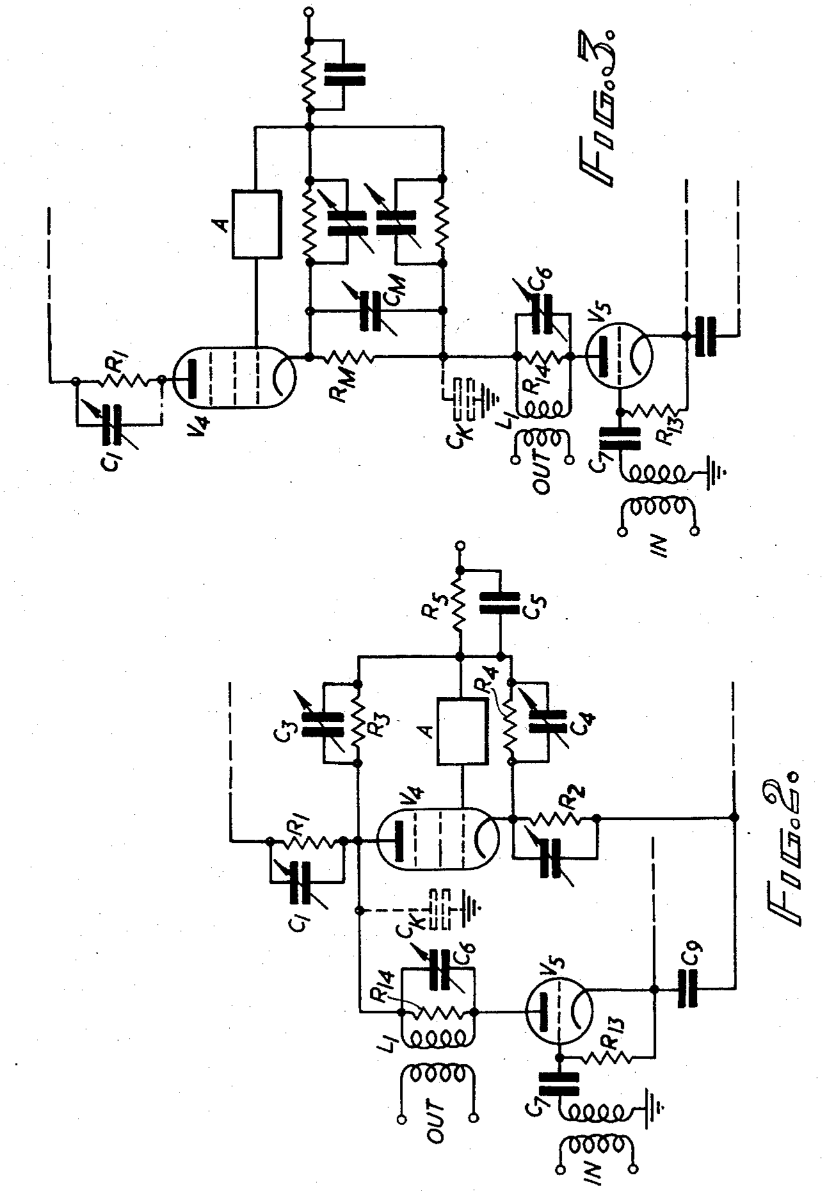
Fig. 2 shows a modified form of circuit which may be used in the system of Fig. 1.
Fig. 3 shows a further modified form of circuit that may be used in the system of Fig. 1.

The diagram of Figs. 2 and 3 show only so much of the circuits as are necessary to an understanding of the embodiments in question, circuit portions which are as in Fig. 1 being not repeated in the showing of Figs. 2 and 3.

Referring first to Fig. 1 which shows the preferred embodiment, carrier frequency to be modulated is applied at terminals IN and thence through a transformer and via a resistance-capacity coupling $R_{13}$—$C_7$ to the control grid of a modulator valve represented for simplicity as a triode $V_5$. The cathode of the valve $V_5$ is connected through a condenser $C_9$ to a negative bias terminal —GB of, for example, 300 volts. The anode circuit of the valve $V_5$ contains a tuned anode load circuit consisting of shunt connected coil $L_1$, resistance $R_{14}$ and condenser $C_6$, the coil constituting the primary of a modulated carrier output transformer from which output is derived at terminals OUT. The anode circuit of the valve $V_5$ also includes in series with the tuned output circuit just mentioned the cathode-anode space of a modulating valve $V_4$ and a resistance $R_1$ shunted by a preferably adjustable condenser $C_1$ the said anode circuit extending to the high tension supply terminal HT+ which may be for example at +300 volts.

The circuit from HT+ to the modulator valve is branched at the cathode of the modulating valve $V_4$, said cathode being connected to the terminal —GB through a resistance $R_2$. Stray capacity effectively across the modulator valve $V_5$ is represented in broken lines by a condenser $C_K$.

Modulating signal input is applied at terminal MI through a resistance $R_5$ shunted by a condenser $C_5$ to the control grid of the first valve $V_1$ of an amplifier comprising the valves $V_1$, $V_2$ and $V_3$. This amplifier is of known form, the last stage thereof, including the valve $V_3$, being a cathode follower driving the control grid of the modulating valve $V_4$. An adjustable tapping point P connected to the control grid of the valve $V_2$ and tapped on a resistance which is connected between HT+ and −GB enables the modulating potential level applied to the valve $V_4$ to be adjusted. Feed-back is taken through a resistance $R_3$ shunted by a preferably adjustable condenser $C_3$ from the anode of the valve $V_4$ to the control grid of the valve $V_1$ and feed-back in phase opposition thereto is taken from the cathode of the valve $V_4$ through a resistance $R_4$ shunted by a preferably adjustable condenser $C_4$ also to the control grid of the valve $V_4$. A cathode follower valve $V_6$ has its cathode connected to the cathode of the valve $V_5$ and also to terminal −GB through a resistance $R_{12}$ and its control grid tapped at PC upon a resistance connected between terminal −GB and the earthed anode of the said valve $V_6$. This valve serves as a means for enabling the D.C. cathode potential of the valve $V_5$ to be adjusted to a convenient desired level, such adjustment being achieved by moving the tap PC.

With this arrangement it will be seen that the instantaneous anode current drawn from terminal HT+ is equal to the sum of the currents through the resistance $R_2$ and through the valve $V_5$. In other words the current into the modulator valve for any given input modulating potential is equal to the current taken from HT+ minus the current through the resistance $R_2$. The instantaneous voltage at the anode of the valve $V_4$ is a measure of the current taken from the terminal HT+ and the instantaneous voltage at the cathode of the said valve is a measure of the current through the resistance $R_2$. Accordingly the difference between these two voltages is a measure of the current through the modulator valve. These two voltages, i.e. those at the anode and cathode respectively of valve $V_4$ are fed back to the grid of valve $V_1$ through the resistances $R_3$ and $R_4$ respectively. If the ratio of the value of resistance $R_3$ to that of resistance $R_1$ is the same as the ratio of the value of resistance $R_4$ to that of resistance $R_2$, then, since the fed-back voltages are in phase opposition, the combined feed-back voltage at the grid of valve $V_1$ will be a measure of the instantaneous current through the modulator valve $V_5$ and the circuit will accordingly automatically adjust itself in such manner that for any given modulating potential input the current through the modulator valve $V_5$ will be of a constant value depending on the adjustment of the tapping point P and independent of the value of the load impedance, i.e. the impedance of the circuit including the anode-cathode space of the valve $V_5$. If for any reason this load impedance is changed—for example as a result of exchanging the valve $V_5$ for another—any change in the current through the valve $V_5$ will produce alteration in feed-back substantially nullifying that change.

It may be shown that if a high loop gain exists, the ratio of the instantaneous current through the modulator valve $V_5$ to the modulating voltage applied at terminal MI is equal to $$\frac{R_3}{R_1}\cdot\frac{1}{R_5}$$

which in turn is equal to $$\frac{R_4}{R_2}\cdot\frac{1}{R_5}$$

where $R_1$, $R_2$, $R_3$, $R_4$, and $R_5$ are the values of the resistances respectively bearing those references in Figure 1.

The circuit will be independent of frequency if the time constant of $R_1C_1$ is equal to that provided by $R_2$ in conjunction with the stray capacity $C_K$ across the modulator valve: if the product $R_3C_3$ equals $R_4C_4$; and if $R_5$ is purely resistive. In the illustrated circuit a compensating capacity $C_5$ is shown across $R_5$ to prevent the frequency response of the circuit tending to fall off too early due to poor frequency response of the valve stage including the valve $V_2$ and insufficient negative feed-back to compensate for this.

Fig. 2 illustrates a modification of the arrangement of Fig. 1, like parts being indicated by like references in both figures.

In Fig. 2 the block A is a simplified schematic representation of the amplifier including valves $V_1$, $V_2$ and $V_3$ of Fig. 1 and it will be seen that the only important difference between the two figures is that in Fig. 2 the modulating valve $V_4$ has its anode-cathode space in a circuit in shunt across the circuit including the modulator valve $V_5$ instead of, as in Fig. 1, being in series in the anode feed-circuit of the said valve $V_5$. This circuit modification obviously involves that the feed-back through the resistance $R_4$ will now be negative feed-back.

In the further modification illustrated in Fig. 3, the modulating and modulator valves $V_4$ and $V_5$ respectively are in direct series with a resistance $R_M$ between them and feed-back potentials are taken from the opposite ends of this resistance to the amplifier which is again represented by a block A. Across the resistance $R_M$ is a preferably adjustable condenser $C_M$ the purpose of which is to compensate for stray capacities effectively across the modulator valve $V_5$ and as represented (as in the other figures) by the broken line condenser $C_K$. The arrangement of Fig. 3 is, however, not preferred because there is no control over the proportion of the currents which flow through the modulator valve $V_5$ and the stray capacitance $C_K$ and if one valve $V_5$ is changed for another, a re-adjustment of the time constant provided by the resistance-capacity combination $R_M$—$C_M$ will almost always be necessary.

We claim:

1. A modulating circuit arrangement comprising a modulator valve including an anode, grid and cathode, means for applying carrier input to said grid, a source of anode potential, a modulating valve including an anode, grid and cathode, a series circuit connected across said source including two impedances with the modulating valve connected therebetween, a direct current connection between the anode of said modulator valve and said series circuit wherein the potential applied from said source to the anode of said modulator valve will vary in accordance with the modulating potentials applied to the grid of said modulating valve, an amplifier, means for applying modulating potentials as input to said amplifier, means for applying amplified modulating potentials from said amplifier to the grid of said modulating valve, means including said series circuit for applying two feedback voltages to the input side of said amplifier.

2. A modulating circuit arrangement according to claim 1 wherein the anode of said modulator valve is connected to said series circuit intermediate said two impedances and wherein one of said feedback voltages is substantially proportional to the anode current of both said modulator and modulating valves and the other feedback voltage is substantially proportional to the difference between the aforesaid current and the anode current of said modulator valve.

3. A modulating circuit arrangement according to claim 1 wherein the modulating valve is connected in a shunt path across a circuit including the anode and cathode of the modulator valve and wherein said feedback voltages are in phase opposition and are derived, respectively, from the anode and cathode of the modulating valve.

4. A modulating circuit arrangement according to claim 1 wherein the modulating and modulator valves are connected in said series circuit and wherein said feedback voltages are taken from across one of said two impedances.

5. An arrangement as set forth in claim 1 wherein the anode-cathode space of the modulating valve is in series between the anode of the modulator valve and the source of anode potential and wherein a direct current permeable impedance is connected in a shunt path extending from the cathode of the modulating valve across a circuit including the anode-cathode space of the modulator valve, and wherein feed-back potential comprising two voltages in phase opposition and taken respectively from the anode and cathode of the modulating valve is applied to the input side of the amplifier.

6. An arrangement as set forth in claim 1 and comprising a series circuit including, in the order stated, the anode cathode space of the modulating valve, a modulated carrier output impedance and the anode-cathode space of the modulator valve between the positive terminal of the anode potential high tension source and earth; and wherein there an oppositely phased feed back circuits between the anode and cathode of said modulating valve and the input side of said amplifier fed with modulating potentials; and a resistance connected to the cathode of said modulating valve and in shunt with that part of said series circuit including said modulated carrier output impedance and said modulator valve.

7. An arrangement as set forth in claim 1 wherein a cathode follower valve has its cathode connected to the cathode of the modulator valve and also to a point of negative potential through a circuit including a resistance, the anode of said cathode follower valve being earthed and the grid thereof being tapped upon a resistance connected between said point of negative potential and earth.

References Cited in the file of this patent

UNITED STATES PATENTS

| | | |
|---|---|---|
| 2,163,670 | Ditcham | June 27, 1939 |
| 2,600,873 | Holloway | June 17, 1952 |
| 2,728,892 | Gluyas | Dec. 27, 1955 |
| 2,794,077 | Olson | May 28, 1957 |